(12) United States Patent
Näslund

(10) Patent No.: US 9,410,450 B2
(45) Date of Patent: Aug. 9, 2016

(54) PROCESS AND SYSTEM FOR RECOVERY OF THERMAL ENERGY FROM A STEAM DRYER

(75) Inventor: Bengt-Olof Näslund, Umeå (SE)

(73) Assignee: OUTOTEC (FINLAND) OY, Espoo (FI)

( * ) Notice: Subject to any disclaimer, the term of this patent is extended or adjusted under 35 U.S.C. 154(b) by 208 days.

(21) Appl. No.: 14/005,723

(22) PCT Filed: Mar. 21, 2012
(Under 37 CFR 1.47)

(86) PCT No.: PCT/SE2012/050313
§ 371 (c)(1),
(2), (4) Date: Oct. 30, 2014

(87) PCT Pub. No.: WO2012/128712
PCT Pub. Date: Sep. 27, 2012

(65) Prior Publication Data
US 2015/0082656 A1    Mar. 26, 2015

(30) Foreign Application Priority Data
Mar. 21, 2011  (SE) ........................................ 1150249

(51) Int. Cl.
*F26B 3/06* (2006.01)
*F01K 17/02* (2006.01)
(Continued)

(52) U.S. Cl.
CPC ............... *F01K 17/02* (2013.01); *F24D 10/00* (2013.01); *F26B 3/06* (2013.01); *F26B 23/002* (2013.01);
(Continued)

(58) Field of Classification Search
CPC .............. F26B 3/00; F26B 3/06; F26B 23/00; F26B 23/002; F01L 7/00; F01L 7/22; F22D 3/00; F22D 3/18; F22D 11/00; B01D 1/00; B01D 1/26
USPC ............ 34/411, 405, 408, 595, 173; 122/7 R; 60/657, 679; 202/176, 178
See application file for complete search history.

(56) References Cited

U.S. PATENT DOCUMENTS 3,972,731 A * 8/1976 Bloomfield ............... F02C 6/00
                                                        429/423
4,026,035 A * 5/1977 Dyer ........................ D21F 5/20
                                                        34/114
(Continued)

FOREIGN PATENT DOCUMENTS

EP         1843114 A1     10/2007
FI    WO 8803605 A1 *     5/1988     ............ F01K 21/047
(Continued)

OTHER PUBLICATIONS

International Search Report dated Jun. 7, 2012 for International Patent Application No. PCT/SE2012/050313 filed Mar. 21, 2012.
(Continued)

*Primary Examiner* — Stephen M Gravini
(74) *Attorney, Agent, or Firm* — Knobbe, Martens, Olson & Bear, LLP

(57) ABSTRACT

The invention concerns a method for the recovery of thermal energy from a steam dryer 2 with a closed circulation 2.1 that produces excess steam SS characterized in that the excess steam SS is condensed to an unclean condensate UC in a steam regeneration unit 3 and in that thermal energy in the unclean condensate UC is recovered by being transferred to a district heating medium HW in a heat exchanger 4 for district heating. The invention concerns also a system for the recovery of thermal energy from a steam dryer 2 with a closed circulation 2.1.

15 Claims, 2 Drawing Sheets

(51) Int. Cl.
  *F24D 10/00* (2006.01)
  *F26B 23/00* (2006.01)
  *F26B 17/10* (2006.01)

(52) U.S. Cl.
  CPC ............ *F26B 17/10* (2013.01); *F26B 2200/24* (2013.01); *Y02E 20/14* (2013.01); *Y02P 70/40* (2015.11); *Y02P 70/405* (2015.11)

(56) References Cited

U.S. PATENT DOCUMENTS

| | | | | | |
|---|---|---|---|---|---|
| 4,510,755 | A | * | 4/1985 | Gartmann | F22D 11/006 60/657 |
| 5,346,592 | A | * | 9/1994 | Madani | B01D 1/26 159/46 |
| 5,421,157 | A | * | 6/1995 | Rosenblatt | F01K 25/08 60/649 |
| 5,687,674 | A | * | 11/1997 | Johanntgen | F22D 1/36 110/234 |
| 7,024,800 | B2 | * | 4/2006 | Carin | F26B 19/005 34/576 |
| 8,266,819 | B2 | * | 9/2012 | Zillmer | B01D 53/261 126/609 |
| 9,181,509 | B2 | * | 11/2015 | Bland | C10L 5/366 |
| 2015/0082656 | A1 | * | 3/2015 | Naslund | F24D 10/00 34/411 |

FOREIGN PATENT DOCUMENTS

| | | | | |
|---|---|---|---|---|
| FI | DK 158274 B | * | 4/1990 | ............ F01K 21/047 |
| JP | EP 2196650 A1 | * | 6/2010 | ............ F01K 23/068 |
| WO | WO 2011/037519 A1 | | 3/2011 | |

OTHER PUBLICATIONS

International Preliminary Report on Patentability dated Sep. 24, 2013 for International Patent Application No. PCT/SE2012/050313 filed Mar. 21, 2012.

Borde and Levy, Chapter 16: Pneumatic and Flash Drying; Handbook of Industrial Drying; $3^{rd}$ Edition. Edited by Arun S. Mujumdar. Boca Raton, Taylor and Francis Group, 2007, pp. 397-410.

Storuman bioenergikombinat. Skellefteå Kraft. Aug. 2006. Archived on Internet Archive Wayback Machine on Aug. 25, 2010; Retrieved from http://web.archive.org/web/*/http://www.skekraft.se/OmOss/* on Sep. 15, 2014. (Cited in International Search Report as retrieved from Internet on Sep. 22, 2011: http://www.skekraft.se/OmOss/Anl%c3%a4ggninger%20och%20projekt/Pdf/Folder_Storuman_low.pdf).

Wahlund, B. et al.; A total energy system of fuel upgrading by drying biomass feedstock for cogeneration: a case study of Skellefteå bioenergy combine. Biomass and Bioenergy 2002, vol. 23, pp. 271-281.

Wimmerstedt, R.; Chapter 32: Drying of Peat and Biofuels; Handbook of Industrial Drying; 3rd Edition. Editor: Arun S. Mujumdar. Boca Raton:Taylor and Francis Group, 2007, pp. 743-754.

* cited by examiner

PROCESS AND SYSTEM FOR RECOVERY OF THERMAL ENERGY FROM A STEAM DRYER

CROSS REFERENCE TO RELATED APPLICATIONS

This application is a U.S. National Phase Application of PCT International Application Number PCT/SE2012/050313, filed on Mar. 21, 2012, designating the United States of America and published in the English language, which is an International Application of and claims the benefit of priority to Swedish Patent Application No. 1150249-9, filed on Mar. 21, 2011. The disclosures of the above-referenced applications are hereby expressly incorporated by reference in their entireties.

TECHNICAL AREA

The present invention concerns a process and a system for the recovery of thermal energy from a steam dryer, according to the introduction to claims 1 and 10. The invention concerns also a bioenergy combine.

THE PRIOR ART

Drying material requires much energy. A steam dryer may be used in order to reduce the energy consumption and the impact on the environment. The steam dryer is provided with a closed circulation in which drying steam circulates and is used repeatedly for the drying of moist material. Excess steam is formed during the drying process, and this is withdrawn from the circulation. The excess steam has a high energy content, which normally is lost since extensive plant is required in order for it to be possible to recover the energy in an efficient manner and at low operating cost.

DESCRIPTION OF THE INVENTION

One purpose of the invention is to offer a method and a system that recovers in an efficient manner the thermal energy in the excess steam that is obtained during the drying of material in a steam dryer with a closed circulation. In particular, the method and the system offer an efficient manner to recover thermal energy from the condensate that is obtained during a steam regeneration process of the excess steam.

This purpose is achieved through the method with the distinctive features that are specified in the characterising part of claim 1 and claim 10 [sic].

One advantage of the method according to the invention is that the thermal energy from the excess steam is recovered in a district heating system.

Another advantage of the method according to the invention is that the thermal energy in the uncleaned condensate from the steam regeneration unit is recovered and is used, instead of being released to the waste water system and thus being lost.

The system according to the invention demonstrates corresponding advantages and technical properties as the above-described method.

Embodiments given as examples are revealed in the non-independent claims.

Further distinctive features and advantages of the invention will be made clear in the following detailed description of the invention, which constitutes an example, and is therefore not to be interpreted in such a manner that it is limiting for the protective scope of the invention. References to the attached drawings have been included in the text in order to facilitate understanding, where equivalent or similar parts have been given the same reference number.

DETAILED DESCRIPTION AND EMBODIMENTS

Figure 1:
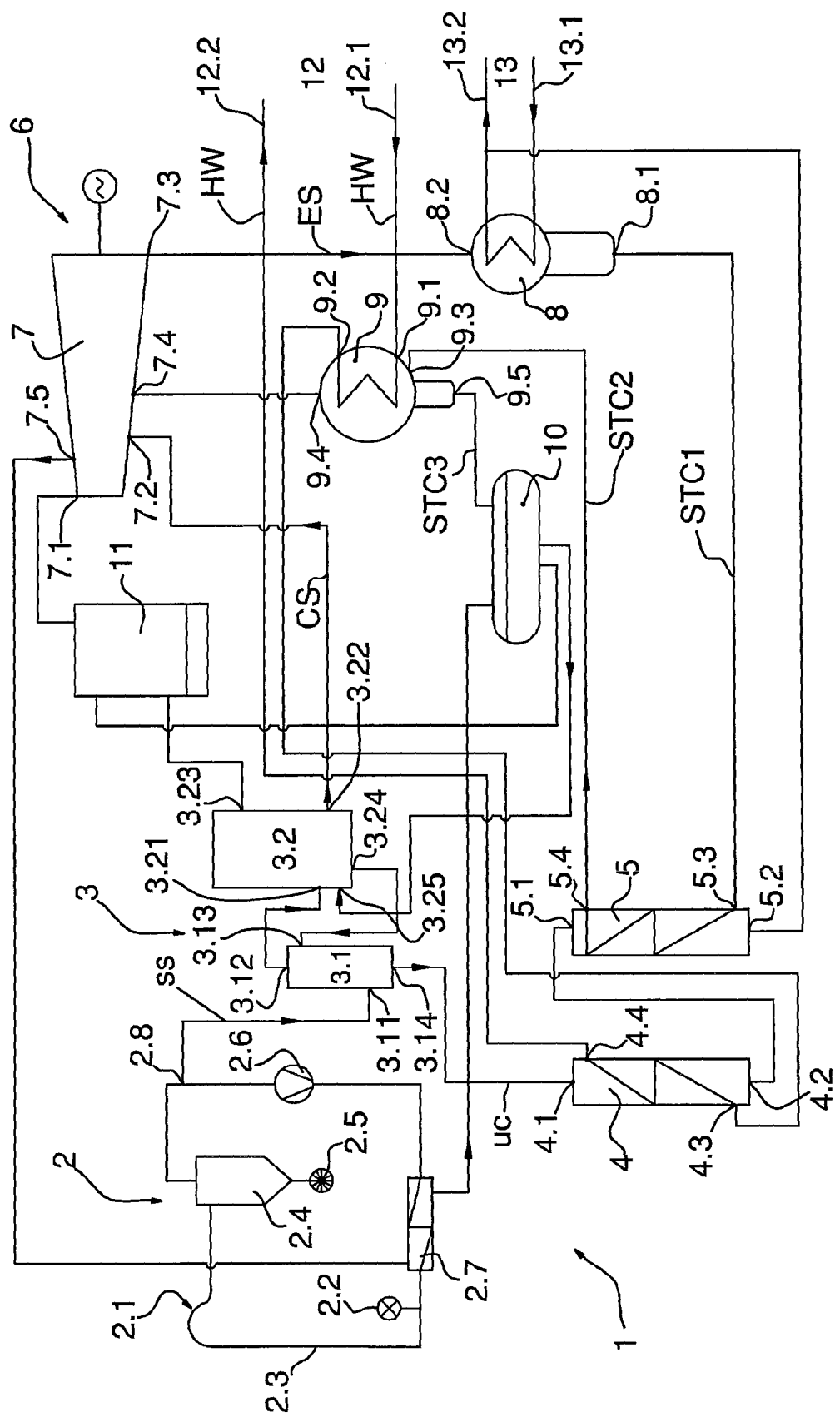
FIG. 1 shows schematically a system according to an embodiment of the present invention.

FIG. 1 shows schematically a system 1 according to an embodiment of the present invention.

The system 1 comprises a steam dryer 2 with a closed circulation, a steam regeneration unit 3, a heat exchanger 4 for district heating and a heat exchanger 5 for heat recovery.

The system 1 comprises also a steam power process 6 comprising a steam cycle that has a steam turbine 7, a low-pressure condenser 8, a combined low-pressure preheater and district heating condenser 9, a supply water tank 10 and a steam boiler 11. The heat exchanger 5 for heat recovery is connected to the steam cycle and functions as a low-pressure preheater. The heat exchanger 5 for heat recovery functions as a first preheating step in the steam cycle, and thus as part of the steam power process. This will be described in more detail below. The steam power process supplies the steam dryer 2 with heat for the drying of moist material.

The various elements of the system are connected by pipes, lines and couplings that allow a medium such as gas or fluid to be transported in a safe manner between the connected elements.

The steam dryer 2 is a pneumatic steam dryer with a circulation 2.1 that comprises an input arrangement 2.2, a drying compartment 2.3 such as, for example, a drying tube, at least one cyclone 2.4 for the separation of dried material from drying steam, an output arrangement 2.5, a fan 2.6, a heat exchanger 2.7 and a withdrawal line 2.8 for the withdrawal of excess steam. The circulation 2.1 comprises also pipelines and couplings in order to connect the various arrangements in the steam dryer. The circulation 2.1 of the steam dryer is essentially closed in order to limit the consumption of energy during the drying process and in order to minimise emissions from the steam dryer. When the steam dryer 2 is in operation, the circulation is placed under a pressure that exceeds atmospheric pressure and it is filled with drying steam. Alternatively, the steam dryer may be adapted to work at a negative pressure. The drying steam principally consists of recirculated steam that has been heated in the heat exchanger. The internal environment of the circulation has a very low content of oxygen, and there is therefore no risk of powder explosions. The level of oxygen is lower than 1%, preferably lower than 0.5%.

All parts of the steam dryer and other arrangements in the circulation are designed to be placed under pressure during operation.

The steam dryer may, alternatively, be designed as a fluid bed dryer adapted to operate with excess pressure or with negative pressure.

The input arrangement 2.2 and the output arrangement 2.5 are designed to be sealed and resist pressure, such that leakage from the circulation is avoided. The input arrangement and the output arrangement may be, for example, a cell feed or plug screw.

The cyclone 2.4 separates the dried material from the drying steam. The separated drying steam is recirculated from the cyclone to a fan and to a heat exchanger.

At least one heat exchanger 2.7 is connected to the circulation 2.1. The heat exchanger 2.7 may be, for example, a tube boiler heat exchanger. Such a heat exchanger normally has a large heat transfer surface and is known to achieve good heat transfer.

The heat exchanger 2.7 is supplied with high-pressure steam from a steam turbine. It is advantageous to superheat the drying steam in the heat exchanger, since the ability of the drying steam to absorb moisture from the material is increased in this case. It is common that the drying steam has an initial temperature of approximately 200° C. after the heat exchanger.

The steam dryer 2 is used to dry moist bulk materials, for example solid pieces of wood, such as wood chips, sawdust, or similar. It is also well-suited to dry peat or agricultural biomass. Bulk material that is to be dried has a size distribution and a particle size that are suitable for it to be pneumatically transported through the circulation. The bulk material has an initial moisture content greater than approximately 30% by weight: the moisture content is often greater than 40% before the drying operation. The dried bulk material is used for, among other applications, fuel and for the manufacture of pellets.

Excess steam SS is formed during the drying process of bulk material. In order to regulate the pressure in the circulation 2.1, excess steam SS is withdrawn from the steam dryer 2 through the withdrawal line 2.8.

The excess steam that is withdrawn from the steam dryer is unclean and contains terpenes, hydrocarbons and particles, which have not been separated from the drying steam in the cyclone. The drying steam should be cleaned from these substances in order to be able to recover the energy in it.

The system according to FIG. 1 comprises also a steam regeneration unit 3 that is connected to the steam dryer 2 through the withdrawal line 2.8 for the excess steam. The steam regeneration unit 3 comprises arrangements for the purification of the excess steam, for example a scrubber 3.1 and a steam reformer 3.2.

A scrubber 3.1 is shown in FIG. 1. The scrubber has a steam inlet 3.11 that is connected to the withdrawal line 2.8 of the steam dryer for excess steam SS, and a steam outlet 3.12 that is connected to a steam reformer 3.2. The scrubber 3.1 has also a condensate inlet 3.13 for unclean condensate UC, which inlet is connected to a condensate outlet 3.25 at the steam reformer. The scrubber has also a condensate outlet 3.14 for the unclean condensate UC, which outlet is connected to a heat exchanger 4 for district heating. The unclean condensate UC that leaves the scrubber through the condensate outlet 3.14 has been heated to a temperature of approximately 140-145° C. The excess steam SS is cleaned in the scrubber 3.1 through direct contact with unclean condensate from the steam reformer through condensation of condensable gases. The excess steam is subsequently led from the scrubber 3.1 to an inlet 3.21 for the excess steam at the steam reformer.

The steam reformer 3.2 comprises an indirect heat exchanger. The steam reformer has one side for clean steam and one side for unclean steam. The side of the steam reformer for unclean steam comprises a steam inlet 3.21 for the excess steam SS connected to the steam outlet 3.12 of the scrubber, a condensate outlet 3.24 connected to the condensate inlet 3.13 of the scrubber, and a gas outlet 3.23 for non-condensable gases connected to a steam boiler 12. The clean steam side of the steam reformer comprises a condensate inlet 3.25 connected to a condensate container 11, for example a supply water tank in the steam power process. The clean steam side comprises also a steam outlet 3.22 for clean steam CS, connected to a steam turbine 7 in the steam power process.

The steam reformer 3.2 receives excess steam SS from the scrubber 3.1 through the steam inlet 3.21.

The steam reformer 3.2 has a means, such as an indirect heat exchanger, to recover thermal energy from the excess steam SS through condensation of the excess steam SS and through the simultaneous vapourisation of clean condensate that is supplied to the steam reformer through the condensate inlet 3.25 for the generation of clean steam CS. The steam reformer 3.2 has also a means, the steam outlet 3.22, to supply the clean steam CS to a steam turbine 7 to be used in electricity production. A fraction of the energy is in this way recovered from the steam dryer in the electricity production, and this leads to a high efficiency for the system.

Also unclean condensate UC is generated during the condensation of excess steam SS, as are non-condensable gases. The non-condensable gases in the excess steam are supplied to the steam boiler 11 and recovered in it.

The unclean condensate leaves the steam reformer 3.2 through the condensate outlet 3.24 and is led to the condensate inlet 3.13 at the scrubber. The clean steam side of the steam reformer has a regulator valve that functions to retain pressure on the unclean steam side, and that is indirectly regulated by the pressure of the drying steam in the steam dryer. The steam reformer has a high efficiency; a large fraction of the energy from the withdrawn excess steam is transferred to clean steam that can be recovered in the steam power process.

The heat exchanger 4 for district heating comprises an indirect heat exchanger. The thermal energy in the unclean condensate UC is recovered in the heat exchanger for district heating and is transferred to a district heating medium HW, instead of the unclean condensate UC being led directly to the waste discharge whereby heat energy is lost.

The heat exchanger for district heating comprises a condensate inlet 4.1 and a condensate outlet 4.2 for the unclean condensate UC. The heat exchanger for district heating comprises also an inlet 4.3 and an outlet 4.4 for a district heating medium HW. The unclean condensate UC that leaves the heat exchanger for district heating has a temperature of approximately 60-90° C. The heat exchanger for district heating is connected to a district heating network 13.

FIG. 1 shows that the condensate outlet 4.2 of the heat exchanger for district heating for unclean condensate is connected to a condensate inlet 5.1 at the heat exchanger 5 for heat recovery in the steam power process 6.

The heat exchanger 5 for heat recovery is an indirect heat exchanger. It comprises a condensate inlet 5.1 and a condensate outlet 5.2 for the unclean condensate UC. The heat exchanger 5 for heat recovery comprises also an inlet 5.3 and an outlet 5.4 for steam turbine condensate.

The thermal energy in the unclean condensate from the excess steam is recovered in the heat exchanger 5 for heat recovery and is transferred to a steam turbine condensate STC1 that is supplied to the heat exchanger 5 for heat recovery from a low-pressure condenser 8 in the steam power process.

As has been described earlier, the heat exchanger 5 for heat recovery functions as a low-pressure preheater. It constitutes the first preheating step in the steam cycle, and it preheats the steam turbine condensate STC1, which is denoted by STC2 after the heat exchanger for heat recovery.

In this way, leading the unclean condensate UC directly to the waste discharge, whereby the heat energy is lost, is avoided. Furthermore, it is advantageous to transfer thermal energy from the unclean condensate from the excess steam to a steam power process, in this way the temperature of the steam condensate in the steam cycle is raised, which is advantageous for the energy economy of the steam power process.

The unclean condensate UC that leaves the heat exchanger 5 for heat recovery through the condensate outlet 5.2 has a temperature of approximately 30-50° C. The steam turbine condensate STC2 that leaves the heat exchanger for heat recovery has a temperature of approximately 40-80° C.

The unclean condensate from the steam regeneration unit 3 is therefore led first into the heat exchanger 4 for district heating where a fraction of the thermal energy in the unclean condensate UC is recovered and transferred to the district heating medium HW. The unclean condensate UC that leaves the heat exchanger for district heating has a remaining fraction of thermal energy that has not been given up in the heat exchanger for district heating. The unclean condensate UC is subsequently led onwards to the heat exchanger 5 for heat recovery in order there to recover as much of the remaining thermal energy as possible to the steam turbine condensate that comes from the low-pressure condenser 8. The heat exchanger 4 for district heating and the heat exchanger 5 for heat recovery are thus fed in serial with the unclean condensate from the scrubber.

The heat exchanger 4 for district heating and the heat exchanger 5 for heat recovery function at different temperature levels, and these are so adapted that as much thermal energy as possible can be recovered from the unclean condensate UC.

FIG. 1 shows the steam power process 6, which comprises a steam cycle that has a steam turbine 7, a low-pressure condenser 8, a combined low-pressure preheater and district heating condenser 9, a supply water tank 10 and a steam boiler 11, together with the heat exchanger 5 for heat recovery. The steam cycle comprises two low-pressure preheating steps in which the steam turbine condensate is preheated before it is supplied to the supply water tank 10. The first low-pressure preheating step comprises the heat exchanger 5 for heat recovery, while the second low-pressure preheating step comprises the combined low-pressure preheater and district heating condenser 9.

The steam boiler 11 produces high-pressure steam that is led to a first steam inlet 7.1 at the steam turbine 7. The steam turbine has also a second steam inlet 7.2, a steam turbine outlet 7.3 and a first steam turbine withdrawal point 7.4. The first steam turbine withdrawal point 7.4 is an unregulated or regulated steam turbine withdrawal point. The steam turbine outlet 7.3 is connected to a low-pressure condenser 8 such that outlet steam ES is led from the steam turbine outlet 7.3 to the steam inlet 8.2 of the low-pressure condenser. The steam turbine 7 is connected through a steam turbine withdrawal point 7.5 also to the heat exchanger 2.7 in the steam dryer 2 and supplies the heat exchanger with high-pressure steam as a heating medium.

The low-pressure condenser 8 comprises an indirect heat exchanger that is connected to the steam turbine outlet 7.3 of the steam turbine, to a cooling water system 13, and to the inlet 5.3 of the heat exchanger for heat recovery for the first steam turbine condensate STC1. The outlet steam from the steam turbine outlet 7.3 is cooled in the low-pressure condenser 8 such that it becomes steam turbine condensate STC1, after which it is led from the condensate outlet 8.1 to the inlet 5.3 for steam turbine condensate of the heat exchanger for heat recovery.

The heat exchanger 5 for heat recovery has been described above. The thermal energy in the unclean condensate UC from the scrubber is recovered and transferred in the heat exchanger for heat recovery to the steam turbine condensate STC1 from the low-pressure condenser 8. The outlet 5.4 for steam turbine concentrate STC2 from the heat exchanger for heat recovery is connected to the combined low-pressure preheater and district heating condenser 9.

FIG. 1 shows that the heat exchanger 5 for heat recovery is connected to the steam regeneration unit 3 through the heat exchanger 4 for district heating. Alternatively, the heat exchanger 5 for heat recovery may be connected directly to the steam regeneration unit 3, and in this way receive unclean condensate UC directly from the steam regeneration unit 3.

FIG. 1 shows also a combined low-pressure preheater and district heating condenser 9 that is a combined direct and indirect heat exchanger.

The combined low-pressure preheater and district heating condenser 9 comprises an inlet 9.1 for district heating medium, an outlet 9.2 for district heating medium, an inlet 9.3 for condensate, an inlet 9.4 for steam and an outlet 9.5 for condensate.

The combined low-pressure preheater and district heating condenser 9 is the second low-pressure preheating step in the preheating chain for steam turbine condensate in the steam cycle, at the same time as it constitutes also the first heating step for the district heating medium HW.

The first steam turbine withdrawal point 7.4 of the steam turbine is connected to the combined low-pressure preheater and district heating condenser 9, such that the steam withdrawn from the steam turbine withdrawal point 7.4 is led into the steam inlet 9.4 of the combined low-pressure preheater and district heating condenser. The withdrawn steam has a pressure of, for example, approximately 0.7 Bar a.

The steam turbine condensate STC2 is led to the condensate inlet 9.3 and onwards to a steam compartment in the combined low-pressure preheater and district heating condenser 9, where the steam turbine condensate STC2 is heated through direct heat exchange with the steam withdrawn from the first steam turbine withdrawal point 7.4. A second preheating of the steam turbine condensate is in this way achieved. The steam turbine condensate is denoted by STC3 after this and it has a temperature of approximately 88° C. The heated steam turbine condensate STC3 is led from the condensate outlet 9.5 onwards to the supply water tank 10 and subsequently to the steam boiler 11.

The district heating medium inlet 9.1 is connected to the return line 12.1 of the district heating network and the district heating medium outlet 9.2 is connected to the inlet 4.3 of the heat exchanger for district heating. The district heating medium HW is heated by indirect heat exchange with the withdrawn steam. The district heating medium HW has a temperature of approximately 85° C. after the combined low-pressure preheater and district heating condenser 9.

By connecting the various components of the system in this way, the thermal energy that is produced in the steam power process is used efficiently. Advantageous temperature differences, flow conditions and falls in pressure are prevalent in each heat exchanger in order to achieve good heat transfer.

According to FIG. 1, the district heating medium HW is led from a district heating system 12 in through the inlet, the return line 12.1 of the district heating network, and is heated in several steps through the combined low-pressure preheater and district heating condenser 9, and through the heat exchanger 4 for district heating, whereby thermal energy is transferred and recovered to the district heating medium HW. It is very advantageous that thermal energy from the steam dryer 2, in particular the thermal energy in the unclean condensate UC, is recovered during the heating of the district heating system, since this leads to lower energy costs for fuel production in the steam dryer and low heating costs for the district heating medium. Furthermore, energy loss is reduced since the energy is recovered from the unclean condensate, which energy otherwise would be led to the waste outlet.

Thermal energy from the unclean condensate from the steam dryer is recovered also in the steam cycle in the steam power process. This is very advantageous since it leads to a higher plant efficiency, while the production of power increases and energy losses for the plant as a whole are reduced.

The steam power process 6 is used for the production of electricity, for the production of heat for the steam dryer and for the heating of the district heating medium, while the steam dryer is used for the production of fuel. By connecting the steam power process to the steam dryer, the system according to the invention is an energy-efficient integration of several energy-producing facilities with a high overall efficiency and reduced operating costs as a consequence.

Figure 2:
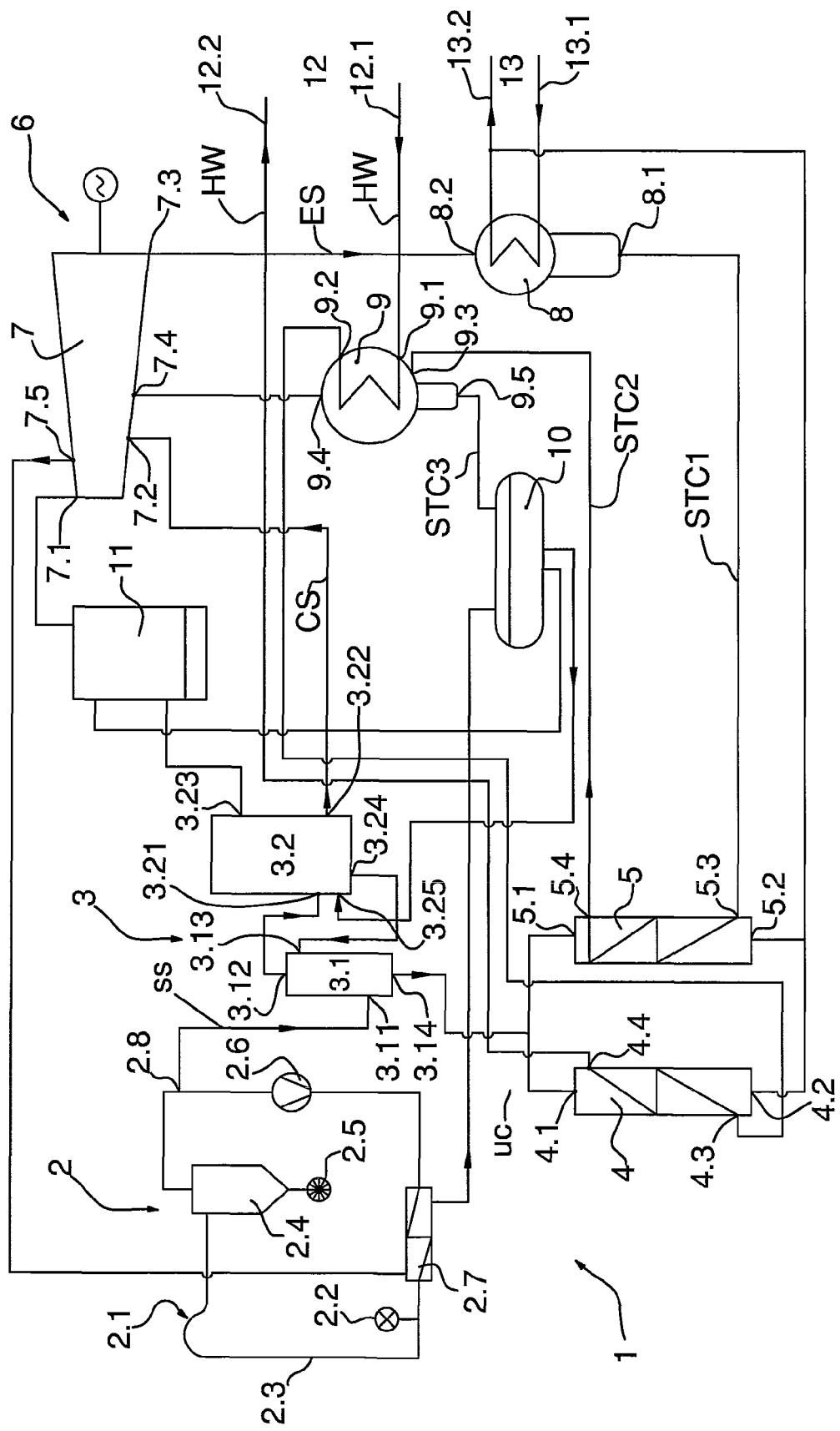
FIG. 2 shows schematically a system according to a second embodiment of the present invention.

FIG. 2 shows a second embodiment of the present invention. The system that is shown in FIG. 2 differs from the system that is shown in FIG. 1 in that the condensate inlet 4.1 for unclean condensate UC at the heat exchanger for district heating and the condensate inlet 5.1 for unclean condensate at the heat exchanger for heat recovery are connected in parallel to the scrubber 3. The heat exchanger 4 for district heating and the heat exchanger 5 for heat recovery are thus fed in parallel with unclean condensate from the steam regeneration unit 3. This means that also the heat exchanger 5 for heat recovery receives unclean condensate directly from the scrubber 3. The heat exchanger for district heating and the heat exchanger for heat recovery thus receive unclean condensate with the same temperature. The heat exchanger 4 for district heating and the heat exchanger 5 for heat recovery are adapted such that as much thermal energy as possible can be recovered from the unclean condensate.

The method according to the invention for the recovery of thermal energy from a steam dryer with a closed circulation that produces excess steam comprises the excess steam being led from the steam dryer 2 to a steam regeneration unit 3, for example a scrubber and a steam reformer. The excess steam is there condensed to an unclean condensate UC, whereby also clean steam CS is obtained. The clean steam CS is recovered in the steam power process 6. It is particularly advantageous to recover the clean steam CS in the steam turbine 7. The unclean condensate UC from the steam regeneration unit 3 is led to a heat exchanger 4 for district heating. The heat exchanger for district heating receives also a district heating medium HW from the combined low-pressure preheater and district heating condenser 9 in the steam power process 6. A part of the thermal energy in the unclean condensate UC is recovered by being transferred to the district heating medium HW in the heat exchanger 4 for district heating, whereby the district heating medium is heated.

The unclean condensate UC is led onwards from the heat exchanger 4 for district heating to a heat exchanger 5 for heat recovery, whereby the thermal energy that has not been recovered in the heat exchanger 4 for district heating is recovered, transferred, to a first steam turbine condensate STC1 in the steam power process.

The steam turbine condensate STC1 is a low-pressure condensate and it is led from a low-pressure condenser 8 in the steam power process to the heat exchanger 5 for heat recovery where the steam turbine condensate STC1 is preheated in the first low-pressure preheating step of the steam cycle.

The recovery of the thermal energy in the unclean condensate UC from the steam regeneration unit 3 takes place in series, whereby a part of the thermal energy in the unclean condensate UC is first transferred to the district heating medium HW in the heat exchanger 4 for district heating. The unclean condensate UC is subsequently led from the condensate outlet of the heat exchanger for district heating to the condensate inlet 5.1 of the heat exchanger for heat recovery. A part of the remaining thermal energy in the unclean condensate UC is transferred in the heat exchanger 5 for heat recovery to the steam turbine condensate STC1 that the heat exchanger for heat recovery has received from the low-pressure condenser 8.

The heat exchanger 4 for district heating and the heat exchanger 5 for heat recovery are thus fed in series with unclean condensate UC from the steam regeneration unit 3.

Of course, the recovery of as much as possible of the thermal energy in the excess steam SS is aspired to. A large fraction of the thermal energy that is produced in the steam boiler and supplied to the steam dryer can be recovered by adapting the temperature levels in the heat exchangers.

Alternatively, the unclean condensate UC can be fed in parallel from the steam regeneration unit 3 to the heat exchanger 4 for district heating and the heat exchanger 5 for heat recovery, as is shown in FIG. 2. The recovery of the thermal energy UC then occurs in parallel, whereby thermal energy in the unclean condensate UC from the steam regeneration unit 3 is transferred to the district heating medium HW in the heat exchanger 4 for district heating and to the steam turbine condensate STC1 that comes from the low-pressure condenser 8 in the heat exchanger 5 for heat recovery.

The steam turbine condensate STC1 to which thermal energy has been supplied in the heat exchanger 5 for heat recovery thereafter is denoted by "STC2". The condensate STC2 is led onwards to the combined low-pressure preheater and district heating condenser 9. Also the district heating medium HW from a district heating return line 13.1 is led to the combined low-pressure preheater and district heating condenser 9. Thermal energy is transferred in the combined low-pressure preheater and district heating condenser 9 from withdrawn steam from a steam turbine withdrawal point 7.4 both to the steam turbine condensate STC2 and to the district heating medium HW. The condensate STC2 from the heat exchanger 5 for heat recovery is in this way preheated at the same time as thermal energy from the withdrawn steam is transferred through indirect heat transfer to a district heating medium HW.

By recovering thermal energy from a steam dryer with a closed circulation 2.1 according to the method described above, a very good energy economy with a high efficiency is obtained in the system. Very little thermal energy is lost. By recovering the thermal energy in several steps, in several heat exchangers connected one after the other, the thermal energy is recovered at several temperature levels. By connecting the steam dryer and the steam regeneration unit with the heat exchanger for heat recovery, it is achieved that the steam turbine condensate STC1 that circulates in the steam cycle is preheated in a first preheating step, and thus the power generated by the steam turbine unit is increased while at the same time the total requirement for energy of the combine as a whole is reduced.

The invention concerns also a bioenergy combine for the manufacture of biofuel, electricity and heat. The bioenergy combine comprises a steam dryer with a closed circulation of the type described above, and a steam power process that comprises a steam cycle of the type described above.

The steam dryer with the circulation dries wood-based material such as wood chips and peat. The dried material is used during the manufacture of biopellets or as fuel in the steam boiler of the steam power process.

The steam power process is, for example, a steam-powered power plant, a condensate-powered power plant or a direct heating power plant. A second type of steam power process is an industry with integrated energy production, of the type sawmill, foundry, or other heavy industry. It is common that these types of plant have at least one turbine that generates electricity. The steam power process produces electricity and heat. The heat is supplied both to the steam dryer and to the district heating system, as has been described above. The bioenergy combine according to the invention comprises also a system for the recovery of thermal energy from the steam dryer of the type described above.

The bioenergy combine achieves energy-efficient integration of several energy-producing plants with a high overall efficiency and reduced operating costs as a consequence.

It is advantageous to integrate the steam dryer with the steam power process and the system for the recovery of thermal energy from the steam dryer. Large gains in energy are obtained and the integration leads to increased flexibility in the production of different types of energy. This leads to a high overall efficiency for the bioenergy combine.

The technical distinctive features in the form of parts and fittings that have been described above can be freely combined within the innovative scope of the invention as long as the result corresponds to the design that is described in the patent claims.

Various embodiments of the invention are specified in the attached patent claims and in the detailed description and drawings given below. The embodiments in the description constitute only various examples of the invention, and they are not to be seen as limiting: all embodiments can be combined and can vary. All technical distinctive features in the embodiments may be freely combined as long as the functionality described is obtained. It is possible to vary and modify the embodiments within the protective scope defined by the claims.

The invention claimed is:

1. A method for the recovery of thermal energy from a steam dryer with a closed circulation that produces excess steam, comprising:
condensing excess steam to an unclean condensate in a steam regeneration unit, wherein the thermal energy in the unclean condensate is recovered by being transferred to a district heating medium in a first heat exchanger for district heating, wherein the thermal energy in the unclean condensate from the steam regeneration unit is recovered in a steam power process, and wherein the thermal energy in the unclean condensate is transferred to a steam turbine condensate in a second heat exchanger for heat recovery, whereby the steam turbine condensate from a low-pressure condenser is heated.

2. The method according to claim 1, wherein the recovery of thermal energy from the steam regeneration unit takes place in a series, such that thermal energy in the unclean condensate is first transferred to the district heating medium in a heat exchanger for district heating and the thermal energy in the unclean condensate is subsequently transferred to the steam turbine condensate in a heat exchanger for heat recovery, and wherein the heat exchanger for district heating and the heat exchanger for heat recovery are fed in series with unclean condensate from the steam regeneration unit.

3. The method according to claim 1, wherein the recovery of the thermal energy takes place in parallel, such that thermal energy in the unclean condensate from the steam regeneration unit is transferred to the district heating medium in the heat exchanger for district heating and to the steam turbine condensate in the heat exchanger for heat recovery, and wherein the heat exchanger for district heating and the heat exchanger for heat recovery are fed in parallel with unclean condensate from the steam regeneration unit.

4. The method according to claim 1, wherein the steam turbine condensate is led from the heat exchanger for heat recovery to a combined low-pressure preheater and district heating condenser and, wherein the district heating medium from a district heating return line is led to the combined low-pressure preheater and district heating condenser, such that thermal energy from steam withdrawn from a steam turbine withdrawal point is transferred both to the steam turbine condensate and to the district heating medium in the combined low-pressure preheater and district heating condenser.

5. The method according to claim 1, wherein the steam dryer works at a pressure that exceeds atmospheric pressure.

6. The method according to claim 1, wherein the steam dryer works at a pressure that lies below atmospheric pressure.

7. The method according to claim 1, further comprising drying organic material in the steam dryer.

8. The method according to claim 1, further comprising drying a wood-based bulk material or a peat-based bulk material in the steam dryer.

9. The method according to claim 1, further comprising drying sewage sludge in the steam dryer.

10. A system for the recovery of thermal energy from a steam dryer with a closed circulation that produces excess steam, wherein the system comprises a steam regeneration unit connected to the steam dryer for the condensation of excess steam to an unclean condensate, wherein a heat exchanger for district heating is connected to the steam regeneration unit and to a district heating system, wherein thermal energy is transferred from the unclean condensate to a district heating medium in the heat exchanger for district heating, wherein a heat exchanger for heat recovery is connected to the steam regeneration unit in order to receive unclean condensate from the steam regeneration unit, and wherein the heat exchanger for heat recovery is connected also to a low-pressure condenser in a steam power process in order to receive a steam turbine condensate from the low-pressure condenser such that thermal energy from the unclean condensate is transferred to the steam turbine condensate in the heat exchanger for heat recovery.

11. The system according to claim 10, wherein the heat exchanger for district heating and the heat exchanger for heat recovery are connected in series to the steam regeneration unit, wherein the unclean condensate from the steam regeneration unit is first led to the heat exchanger for district heating such that thermal energy in the unclean condensate is first transferred to the district heating medium, and wherein the unclean condensate is subsequently led from the heat exchanger for district heating to the heat exchanger for heat recovery such that thermal energy from the unclean condensate is transferred to the steam turbine condensate in the heat exchanger for heat recovery.

12. The system according to claim 10, wherein the heat exchanger for district heating and the heat exchanger for heat recovery are connected in parallel to the steam regeneration unit, wherein the unclean condensate from the steam regeneration unit is led in parallel to the heat exchanger for district heating and the heat exchanger for heat recovery such that thermal energy in the unclean condensate is transferred to the district heating medium in the heat exchanger for district heating and to the steam turbine condensate in the heat exchanger for heat recovery.

13. The system according to claim 10, further comprising a steam cycle, wherein the steam cycle has at least a first low-pressure preheating step comprising the heat exchanger for heat recovery and a second low-pressure preheating step comprising the combined low-pressure preheater and district heating condenser for preheating the steam turbine condensate.

14. The system according to claim 10, wherein the combined low-pressure preheater and district heating condenser is connected to the heat exchanger for heat recovery, wherein the combined low-pressure preheater and district heating condenser comprises a means for direct heat exchange and a means for indirect heat exchange, wherein a district heating return line and a steam turbine withdrawal point are connected to the combined low-pressure preheater and district heating condenser, such that thermal energy from steam withdrawn from the steam turbine withdrawal point is transferred directly by direct heat exchange to the steam turbine condensate and through indirect heat exchange to the district heating medium.

15. The system according to claim 10, further comprising a steam reformer that has a means for the recovery of thermal energy from excess steam through the generation of clean steam, and a means for supplying the clean steam to a steam turbine, which produces electricity.

\* \* \* \* \*